United States Patent [19]

Tzvetanov et al.

[11] Patent Number: 4,513,902
[45] Date of Patent: Apr. 30, 1985

[54] APPARATUS FOR THE AUTOMATIC WELDING OF COMPLEX SHAPES

[75] Inventors: Plamen V. Tzvetanov; Dyanko V. Chankov; Orlin A. Nikolov; Alexander L. Ivanov, all of Sofia, Bulgaria

[73] Assignee: N P K "Zavarachna Technika", Sofia, Bulgaria

[21] Appl. No.: 512,932

[22] Filed: Jul. 12, 1983

[51] Int. Cl.³ ............................................. B23K 1/00
[52] U.S. Cl. ..................................... 228/25; 228/28; 228/29; 228/45; 74/89.12; 74/89.15; 219/60 R
[58] Field of Search ................... 228/7, 25, 27, 28, 29, 228/44.5, 45; 219/60 R, 60 A, 124.1, 124.31, 125.1, 125.11; 74/89, 89.11, 89.12, 89.15, 422, 424.8

[56] References Cited

U.S. PATENT DOCUMENTS

| 817,992 | 4/1906 | Rowland | 228/28 |
| 948,965 | 2/1910 | Budd | 228/28 |
| 2,229,483 | 1/1941 | Toulmin | 74/89.15 X |
| 3,619,552 | 11/1971 | Cape | 228/27 X |
| 3,633,812 | 1/1972 | Haynes | 228/27 |
| 3,666,158 | 5/1972 | Bieker et al. | 228/25 |
| 3,986,405 | 10/1976 | Hatch | 74/89.12 X |
| 4,270,404 | 6/1981 | Murakoshi et al. | 74/89.15 X |

Primary Examiner—Kenneth J. Ramsey
Assistant Examiner—M. Jordan

[57] ABSTRACT

Apparatus for automatic welding of complex contours made up of rectilinear and curvilinear portions. Such apparatus includes first and second movable carriages guided for reciprocation in directions parallel to each other and having a welding torch, a driving unit, and a gear rack with which a driving gear is permanently in mesh. The gear rack is permanently affixed to a first one of said carriages whereas the driving gear is mounted upon a shaft fixedly journalled upon the other of the carriages. The first and second moving carriages are mounted on first and second drive screws, respectively, which are connected to the driving unit by means of a selective motion reversing mechanism. The welding torch is affixed to the shaft bearing the gear which is in mesh with the rack. If suitable torches are used, the apparatus can also be used for cutting, building-up, and surfacing operations.

3 Claims, 1 Drawing Figure

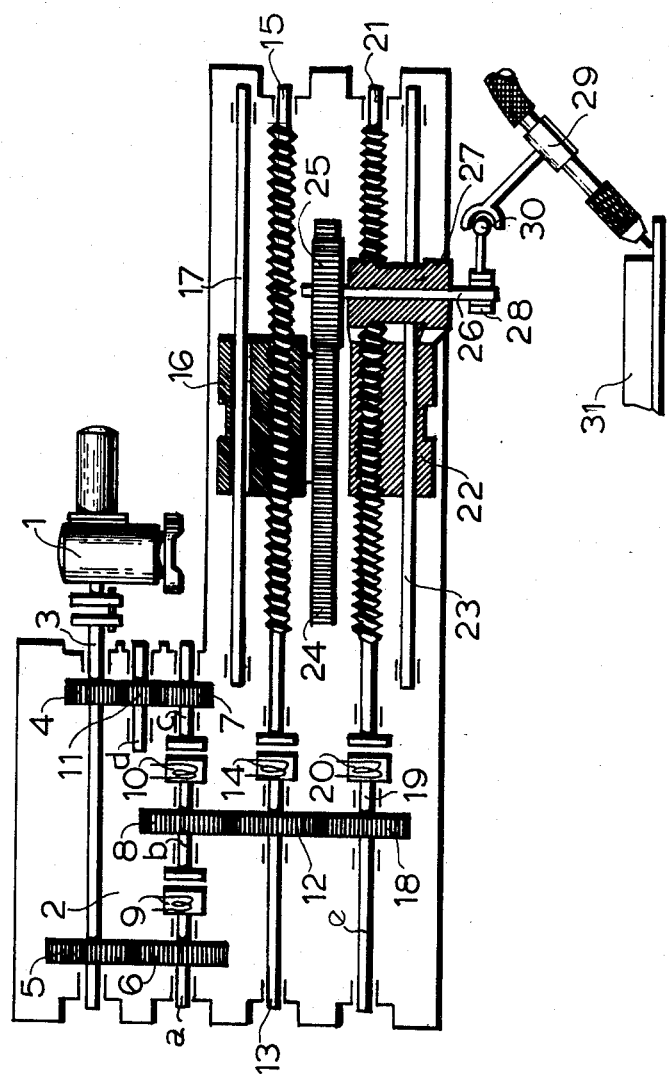

APPARATUS FOR THE AUTOMATIC WELDING OF COMPLEX SHAPES

This invention relates to an apparatus for the automatic welding of complex shapes. The invention may be used to advantage in welding products having seam configurations of rectilinear or circular shape; such circular shape may be parts of a circle of different sequences.

An apparatus for welding complex shapes is disclosed in "Zis Mitteilungen", No. 11, 1977, p. 1274, FIG. 6. Such apparatus has a circular rail track along which a welding tractor is mounted for movement. A welding torch is fitted to the welding tractor. The circular rail track, in turn, is fixedly mounted on a second welding tractor mounted upon a rectilinear rail track and adapted to move therealong.

There are shortcomings of the above-known prior apparatus: it is impossible for it to weld along a curvilinear shape or contour having a small or medium-sized radius since the minimum revolving radius of the welding torch is restricted by the allowable bending radius of the rail track and the capabilities of the welding tractor. The prior device permits welding of rectilinear stretches of limited length, since the rectilinear rail track lengths are restricted by the bending radius of the circular rail track.

Another prior apparatus for welding following complex shapes or contours is disclosed in Zis Mitteilungen, No. 9, 1978, p. 817, FIG. 4. This device has two columns with a beam mounted on them on which a first movable carriage is disposed. The first movable carriage has bearing seats wherein cylindrical rollers rest. A box is fixed to the moving carriage where a motor with a speed reducing gear unit and a gear affixed to its shaft is mounted. A gear rack is mounted on the beam so as to be permanently in mesh with the gear, and the cylindrical rollers are connected by flat guides welded to the beam. On the movable carriage, laterally of the beam, there is mounted a second beam having the identical device. The two carriages carrying the two beams are interconnected by both connections. A bearing box is fitted to the second beam where there is disposed a shaft driven by a DC electric motor, a welding torch being affixed or fitted to the shaft.

The disadvantages of such last-described prior art apparatus are the following: its design is very complicated since it is made up of many components; the speeds of the two electric motors have to be matched since their speeds are different in order to have the same peripheral speed in the rectilinear and the circular sectors. The device is rather inert due to the start-up and stop of different motors in order to perform welding along complex shapes. The electric motors should be reversible in powering the rectilinear motions of the device if the device makes a circuit in only one direction; all electric motors should be reversible if the travel of the device is in reverse directions.

The present invention has among its objects the provision of an apparatus for automatically welding complex shapes or contours which has a simplified design, and which guarantees the accurate guiding of the welding torch along a pre-set complex welding shape made up of rectilinear and curvilinear sectors or parts of curvilinear sectors in different sequence, with a constant feed of the welding torch, while maintaining a permanent angle between the torch axis and the normal of the welding contour in each point of the welding seam being formed.

The apparatus of the invention complies with the above requirements. Such apparatus includes first and second movable carriages fitted on a first and a second pair of guides, respectively, and having a welding torch, a driving unit, and a gear rack with which a driving gear is permanently in mesh. The first and second moving carriages are mounted on first and second drive screws, respectively, which are connected to the driving unit by means of a selective motion reversing mechanism. A rack gear is secured to the first carriage so as to move longitudinally therewith, and a gear is mounted on a shaft journalled in a bearing affixed to the second movable carriage. The welding torch is affixed to the shaft.

The advantages of the apparatus according to the invention are the following: the advantage permits the carrying out both of butt-jointed seams and fillet plane welds, both on a closed or open path made up of rectilinear and circular portions. The drive is from one electric motor requiring no reversible operation when the direction of motion of the welding torch is changed. The positive manner of guiding the welding torch is by means of the cooperating rack gear and gear meshing therewith, and the two drive screws guarantee a fixed welding speed and angle between the axis of the welding torch and the normal to the contour being welded in every point of the welding seam. Due to the simple kinematic drive train, rapid resetting for different welding trajectory configurations is guaranteed.

In the accompanying drawing:

The single FIGURE of the drawing is a schematic kinematic diagram of a preferred embodiment of the apparatus of the invention.

The apparatus of the invention shown in the drawing has a driving unit 1, e.g. in the form of an electric motor with a gear speed reducer, unit 1 being connected to a selectively operated reversing or shifting mechanism 2. Mechanism 2 has a drive shaft 3 connected to the output of the driving unit 1, axially spaced gears 4 and 5 being fixedly mounted upon the shaft 3. As shown, the shaft 3, as well as the other shafts and screws of the apparatus, are rotatably mounted in bearings fixed to the frame of the apparatus, such bearings being shown here in the form of short sleeves telescoped about the respective shaft. The gear 5 meshes with a gear 6 fixedly mounted upon a short shaft a. Gear 4 meshes with an idler gear 11 mounted upon a short shaft d, gear 11 in turn meshing with a gear 7 fixedly mounted upon a short shaft c. Mounted upon the axially inner end of shaft a is one component of a first magnetic clutch 9, the other component of clutch 9 being fixedly mounted upon the lefthand end of the shaft b. The righthand end of shaft b has fixedly mounted thereupon one component of a magnetic clutch 10, the other component of clutch 10 being fixedly mounted upon the shaft c.

The shaft b has a gear 8 fixedly mounted upon it, gear 8 meshing with a gear 12 which is affixed to a further shaft 13 disposed parallel to shafts 3, a, b, c, and d. Gear 12 meshes with another gear 18 which is fixedly mounted upon yet another shaft e which is disposed parallel to all of the other above-recited shafts.

A first drive screw 15 is mounted in the righthand end of the apparatus in alignment with the shaft 13. A second drive screw 21 of a hand the same as that of screw 15 is mounted parallel to drive screw 15 and in alignment with the shaft e. Shaft 13 is selectively coupled to the first drive screw 15 by a magnetic clutch 14, one main component of which is fixedly connected to shaft 13 and the other main component of which is fixedly connected to the lefthand end of drive screw 15. The second drive screw 21 is selectively coupled to the shaft e by a magnetic clutch 20, one main component of which is fixedly connected to shaft e, and the other main component of which is fixedly connected to the lefthand end of the drive screw 21.

A first movable carriage 16 is guided for movement longitudinally of the screw 15 by a pair of guides 17 (one shown), carriage 16 having a threaded passage or member fixedly connected thereto which threadedly receives the first drive screw 15, so that rotation in a selected direction of the first drive screw 15 drives the carriage in a first longitudinal direction, and rotation of screw 15 in the other direction drives the carriage 16 in the other longitudinal direction. A second movable carriage 22 is guided for linear movement parallel to the second drive screw 21 and is guided in such movement by a pair of guides 23 (one shown). The second drive screw 21 is threadedly received in a part fixedly attached to the second movable carriage 22 so that rotation of the second drive screw 21 in one direction drives the carriage 22 in a first longitudinal direction and rotation of the second drive screw 21 drives the carriage 22 in the other longitudinal direction.

A vertical shaft 26 is journalled in bearings affixed to the second movable carriage 22, the upper end of the shaft 26 having a gear 25 fixedly secured thereto. Gear 25 meshes with a longitudinally extending rack gear parallel to the drive screws 15 and 21 and the guides 17 and 23, the rack gear 24 being fixedly secured to the first movable carriage 16.

The vertical shaft 26 extends below the second movable carriage 22, such lower end having fixedly secured thereto a bracket 28 having a radial arm secured to it. A welding torch 29 is secured to the bracket 28 by a hinged connection 30 between the torch and the radial arm secured to the bracket 28. The lower, operative end of the welding torch 29 is directed toward a workpiece 31, specifically toward a seam to be welded between two parts making up such workpiece.

The above-described apparatus operates as follows:

The drive from the unit 1 is transmitted by means of gears 5 and 6 or by means of gears 4, 11 and 7 depending upon the selective energization of the electromagnetic clutches 9 and 10 associated with gears 8, 12 and 18. The first and second drive screws 15 and 21, respectively, are driven or are motionless depending on the switching or shifting of the electromagnetic clutches 14 and 20. When only the electromagnetic clutch 14 is energized, the first movable carriage 16 is driven linearly. The second drive screw 21 is driven when the electromagnetic clutch 20 is energized, thereby to drive the second movable carriage 22 linearly. Upon the simultaneously energization of electromagnetic clutches 14 and 20, the first drive screw 15 and the second drive screw 21 and the first movable carriage 16 and the second movable carriage 22 are driven simultaneously. In such case, rack gear 24 and gear 25 meshing therewith are shifted together at a welding speed without any relative motion between them, and in this manner the welding torch 29 moves rectilinearly in the straight sections of the seam being welded. When the first drive screw 15 is driven independently, the translatory motion is transmitted only to the rack gear 24, but as it is permanently in mesh with gear 25, the latter receives circular movement and at the same time makes no translatory movement. In this way the welding torch 29 travels about the circular sectors of the seam to be welded.

The bearing box 27 which rotatably mounts the vertical shaft 26 and the means on the first movable carriage 16 mounting the rack gear 24 are adjustable toward and away from each other so as to accomodate gears 25 of different radii while maintaining such gears in mesh with the rack gear 24. Gears 25 having different radii are used when the radius of the circular portions of the seam to be welded are different from those of a previous, given workpiece. The radius of the gear 25 is so chosen as to have the radius of its pitch circle equal to the radius of the circular portion of the seam to be welded, and are so chosen that the speed of rotation of the first drive screw 15 and the second drive screw 21 remain constant; in this way a constant speed of welding can be maintained both in the circular and rectilinear portions of a seam to be welded. The sequence of energization of electromagnetic clutches 9, 10, 14 and 20 is programmed in advance depending on the sequence of and length of the rectilinear and curvilinear sections of a seam to be welded.

When the apparatus of the invention is mounted on a step-by-step conveyor moving in pre-set steps in a direction perpendicular to the basic rectilinear movement of the torch, more complicated contours or shapes of a seam can be welded. The apparatus of the invention can also be used for cutting, building-up of metals, and surfacing simply by replacing the welding torch 29 by a suitable torch for cutting, building-up, or surfacing operations.

Although the invention is described and illustrated with reference to a single preferred embodiment thereof, it is to be expressly understood that it is in no way limited to the disclosure of such preferred embodiment but is capable of numerous modifications within the scope of the appended claims.

We claim:

1. An apparatus for the automatic welding of complex contours made up of rectalinear and curvilinear sectors, said apparatus including first and second carriages reciprocating parallel to each other, one of said carriages having a rack gear fixedly connected thereto and the other of said carriages having a shaft journalled thereon and carrying a gear in mesh with said rack gear, a welding torch mounted upon said shaft journalled on the second carriage, and means for selectively reciprocating the first and second carriages together in synchronism whereby to move the welding torch rectalinearly and for reciprocating only the first carriage while holding the second carriage in a fixed position whereby to move the welding torch in an arch.

2. Apparatus according to claim 1, wherein the first and second movable carriages are driven by respective parallel drive screws, a driving unit for the screws, and means for selectively driving the screws together in one or the other direction and for rotating the screw driving the first carriage in either one or the other direction while holding the screw which drives the second carriage from rotation.

3. The apparatus according to claim 2, comprising a drive train interposed between the driving unit and the two drive screws, said drive train comprising in the order named from the driving unit to the drive screws a selectively operated motion reversing mechanism and means drivingly connecting each of the drive screws to the output of the motion reversing mechanism, the connection between the last-named means and each of the drive screws having an on-off clutch interposed therein.

* * * * *